(12) United States Patent
Mallebrein

(10) Patent No.: US 7,077,084 B2
(45) Date of Patent: Jul. 18, 2006

(54) METHOD FOR OPERATING AN INTERNAL COMBUSTION ENGINE

(75) Inventor: Georg Mallebrein, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 487 days.

(21) Appl. No.: 10/350,187

(22) Filed: Jan. 24, 2003

(65) Prior Publication Data

US 2003/0136364 A1    Jul. 24, 2003

(30) Foreign Application Priority Data

Jan. 24, 2002 (DE) ................................ 102 02 840
Sep. 11, 2002 (DE) ................................ 102 42 115

(51) Int. Cl.
*F01L 1/34* (2006.01)
(52) U.S. Cl. ............................... 123/90.15; 123/90.11; 123/90.16; 123/90.17
(58) Field of Classification Search ............. 123/90.11, 123/90.15, 90.16, 90.17
See application file for complete search history.

(56) References Cited

U.S. PATENT DOCUMENTS

| | | | |
|---|---|---|---|
| 4,703,734 A | 11/1987 | Aoyama et al. | |
| 5,143,037 A | 9/1992 | Sawamoto | |
| 5,347,962 A | 9/1994 | Nakamura et al. | |
| 6,055,948 A | 5/2000 | Shiraishi et al. | |
| 6,615,129 B1 * | 9/2003 | Kabasin | 701/110 |

FOREIGN PATENT DOCUMENTS

DE    4229186 A1 *    3/1994

* cited by examiner

Primary Examiner—Thomas Denion
Assistant Examiner—Zelalem Eshete
(74) Attorney, Agent, or Firm—Walter Ottesen

(57) ABSTRACT

An internal combustion engine includes at least one inlet valve whose operation can be described at least by the parameters: opening angle, closing angle, valve stroke curve (H1, H2) and phase position (pn) of the valve stroke curves (H1, H2). At least one of the parameters (pn) can be continuously shifted and at least one other parameter (H1, H2) can be switched stepwise. In order to avoid jumps of the torque generated by the engine when switching over, it is suggested that, in advance of a switchover (74) of the step-wise switchable parameter (H1, H2), the continuously shiftable parameter (pn) is so adjusted (72) that, with the switchover (74) of the stepwise switchable parameter (H1, H2), at least one condition variable (rl) of the combustion of a combustion chamber assigned to the inlet valve is not changed or not significantly changed.

12 Claims, 5 Drawing Sheets

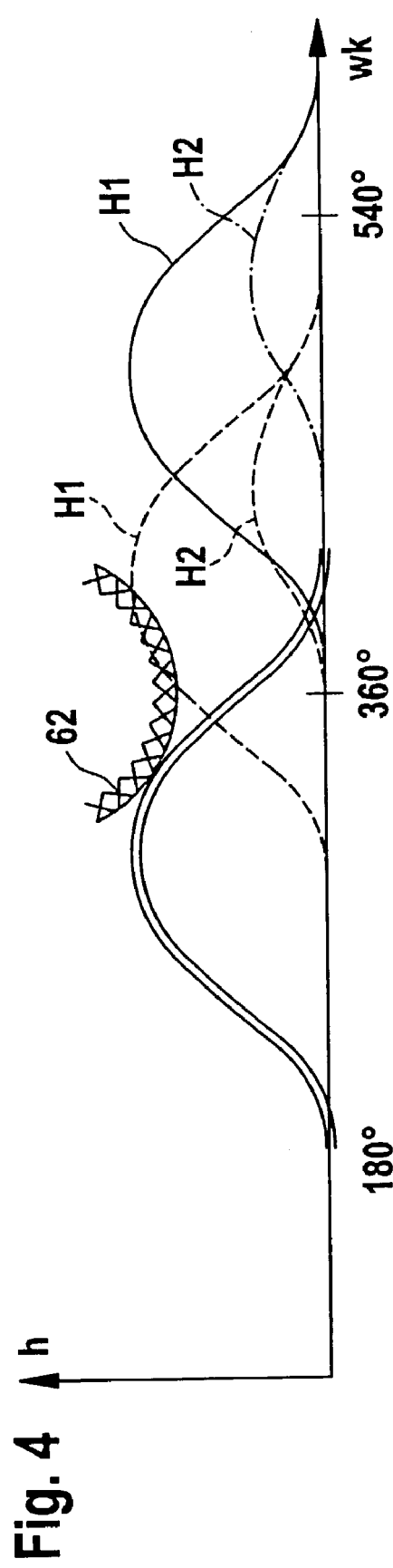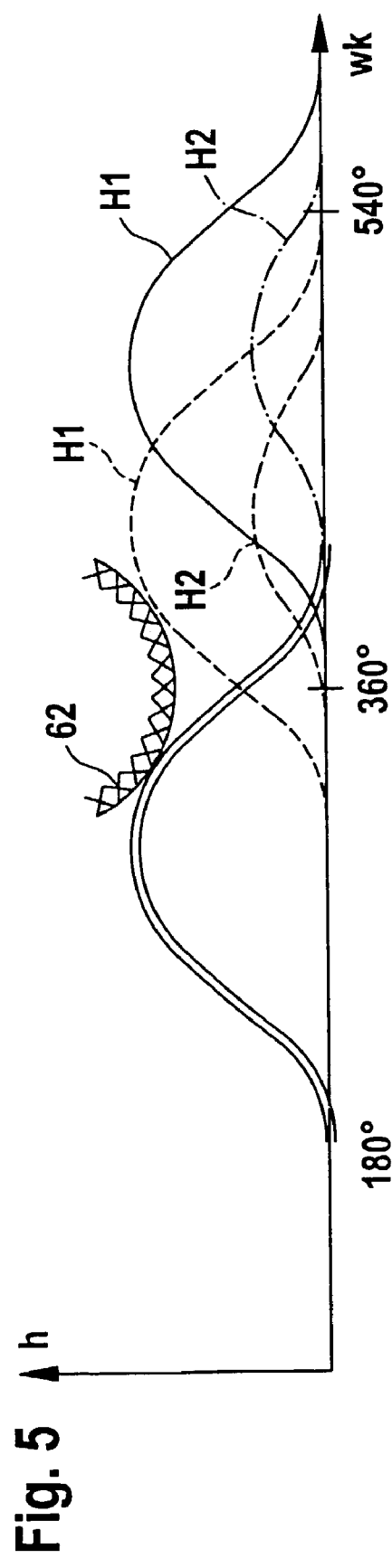

METHOD FOR OPERATING AN INTERNAL COMBUSTION ENGINE

FIELD OF THE INVENTION

The invention relates to a method for operating an internal combustion engine having at least an inlet valve and whose operation can be described at least by the parameters: opening angle, closure angle, valve stroke curve and phase position of the valve stroke curve and wherein at least one of the parameters is continuously shifted and another parameter can be switched stepwise. The invention also relates to a computer program, a control apparatus for operating the engine as well as an internal combustion engine.

BACKGROUND OF THE INVENTION

A method of the above kind is known from the marketplace. A corresponding internal combustion engine includes a so-called variable valve control. Variable valve controls of this kind afford the advantage that (especially in internal combustion engines which can be also operated at high rpms) the requirement for reduced exhaust-gas emissions and low consumption can be well satisfied at high rpms (in the maximum power range) as well as in the mid rpms (in the range of the best torque) and, finally, also at low rpms.

Usually, the inlet valves of internal combustion engines are actuated by a camshaft. With these camshafts, the crankshaft of the engine opens and closes the corresponding inlet valve at a specific opening angle or closing angle, respectively. The valve stroke curve is determined by the form of the cam when the inlet valve is actuated by a camshaft. The phase position of the valve stroke curve is usually likewise referred to the cylinder-individual angle of the crankshaft of the engine and is dependent upon the angular position of the camshaft relative to the crankshaft.

From the state of the art, various types of variable valve controls are known. Accordingly, it is possible to rotate the camshaft during the operation of the engine as required about its longitudinal axis relative to the crankshaft. The rotation of the camshaft is possible continuously between two end positions. In this way, the phase position of the valve stroke curve can be changed continuously between two end positions.

It is also possible to displace a camshaft in the longitudinal direction having cams with a profile which changes in the axial direction of the camshaft. In this way, all of the above-mentioned parameters can be changed.

Furthermore, there are camshafts where there is not only one cam profile but there are two cam profiles arranged in pairs for controlling an inlet valve. With a shift of such a camshaft in its longitudinal direction, a selection can be made between the two valve stroke curves which are pre-given by the respective cams.

With such a switchover from one valve stroke curve to another, the problem is presented that, without corresponding countermeasures, various condition variables of the combustion in the combustion chamber and, as a consequence, also the torque of the engine, can suddenly change. If, for example, there is a switchover from a valve stroke curve having a long valve stroke to a valve stroke curve having a short valve stroke, there is suddenly less fresh air getting into the combustion chamber which, in turn, has the consequence of a corresponding jolting of the engine.

So that no sudden jump in torque of the engine occurs, up to now, the following are synchronized with high complexity: the stroke switchover, the drive of the throttle flap of the engine, the output of an ignition angle and the injection of fuel into the combustion chamber.

The control of this synchronization requires a knowledge of the switchover time point as precise as possible which can be clearly delayed with respect to the drive itself in a hydraulic shift system and here especially when the oil is cold. Furthermore, the diagnosis of such a system is also very complex. The diagnosis is necessary because an incorrect shift position (for example, also of only one cylinder) can lead to misfires or unwanted accelerations or decelerations of the engine. This is furthermore possible even at low or mid rpms.

SUMMARY OF THE INVENTION

It is an object of the invention to improve a method of the kind described above so that the synchronization complexity and diagnostic complexity can be reduced or is even entirely eliminated.

The method of the invention is for operating an internal combustion engine having at least one inlet valve. The engine has an operation defined at least by the following parameters: opening angle, closing angle, valve stroke curves (H1, H2) and phase position (pn) of the valve stroke curves (H1, H2), and wherein a first one of the parameters is continuously shiftable and a second one of the parameters can be switched in steps, the method comprising the steps: adjusting the first parameter so that at least one condition variable of the combustion of a combustion chamber assigned to the inlet valve does not change or does not change significantly when later switching over the second parameter; and, then, switching over the second parameter.

In accordance with the invention, it was recognized that with the plurality of parameters, which define the actuation of the inlet valve, similar or even the same combustion conditions can be obtained in the combustion chamber with different parameter combinations. As a consequence, the continuous adjustability of the one parameter makes it possible to adjust this one parameter so that a change of the switchable parameter has no effect or no significant effect on one or several condition variables of the combustion in the combustion chamber.

When the torque-relevant combustion parameters in the combustion chamber are, however, not affected by the switchover or not significantly so affected, then a complex synchronization, for example, of the ignition time point, the injection time point and the throttle flap position with the switchover operation of the switchable parameter and the diagnosis of this synchronization can be omitted. The engine can therefore be manufactured at less cost.

According to a feature of the invention, the condition variable of the combustion includes a fresh air charge and/or a combustion centroid. These two parameters have an especially significant influence on the torque of the engine.

It is also suggested that: the stepwise switchable parameter is the valve stroke curve in such a manner that the different valve stroke curves differ by at least the particular maximum stroke; and, the continuously adjustable parameter is the phase position of the valve stroke curve.

Each one of these parameters is a parameter which, on the one hand, has an especially great influence on the combustion in the combustion chamber and with which the general advantages of a variable valve control can be especially well realized. Furthermore, these parameters can be comparatively simply changed.

It is especially advantageous when the closing angle of the inlet valve is approximately the same for the same phase position in all valve stroke curves and the switchover of the valve stroke curve only takes place at low rpms. The basic idea of this feature of the invention is the fact that the closing time point or closing angle of the inlet valve has a substantial influence on the fresh air charge in the combustion chamber especially at low rpms. In this way, and when the switchover of the valve stroke curves takes place only at low rpms, this switchover can take place substantially independently of the phase position of the valve stroke curve. This method is therefore especially simple to realize.

It is most advantageous when, at the time point of the switchover of the valve stroke curve, no or essentially no valve overlap is present between the inlet valve and an outlet valve. In this way, a residual gas component, which is present in the combustion chamber because of an internal exhaust-gas recirculation, is not significantly changed when switching over the valve stroke curve. At a given ignition angle, the combustion centroid and, therefore, the torque of the engine, changes only little as a consequence.

In an advantageous embodiment of the method of the invention, it is suggested that a valve stroke curve having a shorter maximum stroke is arranged approximately at the center within a valve stroke curve having a longer maximum stroke and that the switchover from one valve stroke curve to another takes place at a late phase position of the valve stroke curves wherein approximately the same fresh air charge is obtained in the combustion chamber with both valve stroke curves.

In this way, the fact is taken into account that, under some circumstances, no adequate early displacement of the stroke curve having a short maximum stroke is possible when making the closure angle of the individual inlet valve stroke curves equal. However, the fuel savings potential, which results from the corresponding dethrottling, can be optimally used only by a so great an early shift. However, an early shift of a valve stroke curve has limits because of the danger of collision with the piston moving in the combustion chamber: when there is incorrectly a switchover from a stroke curve having a short maximum stroke to a stroke curve having a long maximum stroke, and the stroke curves would be shifted greatly towards "early", then such a danger of collision of the inlet valve with the piston exists which would lead inexorably to damage of the engine.

The suggested configuration of the method of the invention makes possible to shift the phase position of the valve stroke curve having a short maximum stroke sufficiently to "early" and, at the same time, to leave the phase position of the valve stroke curve having a long maximum stroke at "late". In this way, the danger of a collision of the inlet valve with the piston for an incorrect switchover to a valve stroke curve having a long maximum stroke is reduced. However, to nonetheless not generate a torque jump when switching over, this switchover takes place at a comparatively late phase position and at such a crank angle at which approximately the same fresh air charge is obtained in the combustion chamber with both valve stroke curves.

It is also possible that a plurality of inlet valves per combustion chamber is present and one of the valve stroke curves of at least one of these inlet valves has a maximum stroke of zero. Basically, the corresponding inlet valve is switched off via such a valve stroke curve.

As an alternative to the solution mentioned initially herein, and according to a feature of the invention, the closing angle of the inlet valve for all valve stroke curves is approximately equal and the switchover from one valve stroke curve to another valve stroke curve takes place only at low rpms. This variation of the method of the invention is especially simple and can be economically realized.

The invention also relates to a computer program which is suitable for carrying out the above method when it is executed on a computer. Here, it is especially preferred when the computer program is stored on a memory especially on a flash memory.

The invention relates also to a control apparatus for operating an internal combustion engine. It is especially preferred when the control apparatus includes a memory on which a computer program of the above kind can be stored.

Furthermore, the invention relates to an internal combustion engine which includes a control apparatus (open loop and/or closed loop) of the above kind.

BRIEF DESCRIPTION OF THE DRAWINGS

The invention will now be described with reference to the drawings wherein:

FIG. 4 is a diagram wherein the valve stroke curves of FIG. 2 are plotted for different phase positions of the camshaft compared to a crankshaft;

FIG. 5 is a diagram similar to FIG. 4 and shows a variation of the valve stroke curves;

DESCRIPTION OF THE PREFERRED EMBODIMENTS OF THE INVENTION

Figure 1:
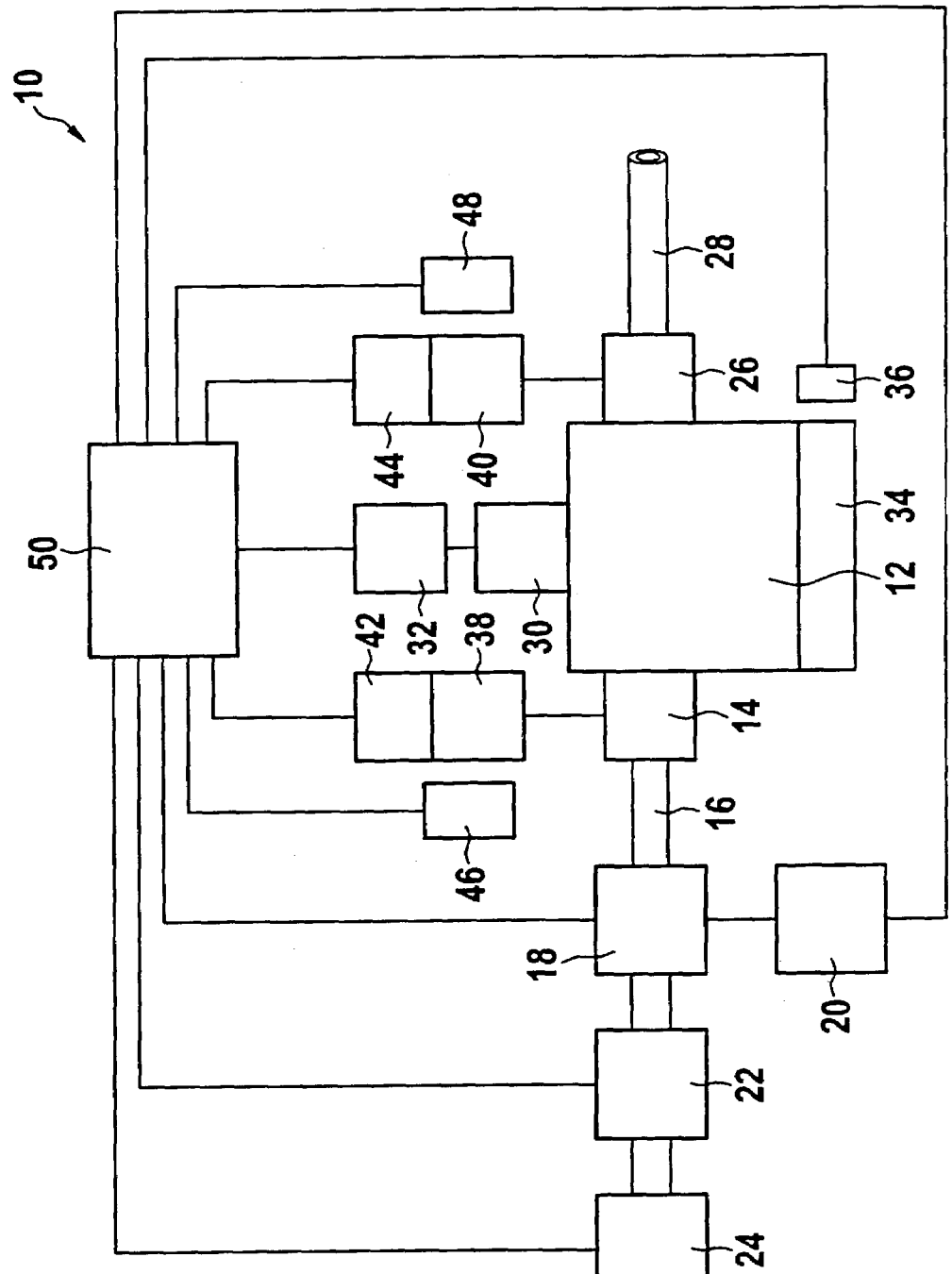
FIG. 1 is a schematic block diagram of an internal combustion engine having an inlet valve which is driven by a switchable and displaceable camshaft.

In FIG. 1, reference numeral 10 identifies the overall internal combustion engine. The engine includes several cylinders of which only one is shown in FIG. 1 and which includes a combustion chamber 12. Combustion air is supplied to the combustion chamber 12 via an inlet valve 14 and an intake manifold 16. An injector 18 injects fuel into the intake manifold 16. The fuel is prepared by a fuel system 20. A throttle flap 22 makes possible a constriction of the cross section of the intake manifold 16. The air mass, which is drawn in by suction from the intake manifold 16, is detected by an HFM sensor (hot film air mass sensor) 24.

The combustion exhaust gases are directed from the combustion chamber 12 into an exhaust-gas pipe 28 via an outlet valve 26. An air/fuel mixture, which is disposed in the combustion chamber 12, is ignited by a spark plug 30 which, in turn, is driven by an ignition system 32. A piston (not shown) is connected to a symbolically illustrated crankshaft 34 via a connecting rod (not shown). The angular position and the rpm of the crankshaft 34 are detected by a sensor 36.

The inlet valve 14 is actuated by an inlet camshaft 38 and the outlet valve 26 is actuated by an outlet camshaft 40. The camshafts 38 and 40 can be shifted by actuators 42 and 44, respectively, in a manner explained hereinafter. The instantaneous angular position of the inlet camshaft 38 is detected by a sensor 46. The instantaneous angular position of the outlet camshaft 40 is detected by a sensor 48.

The operation of the engine 10 is controlled (open loop and/or closed loop) by a control apparatus 50. The control apparatus 50 is connected at its input end to the following: the HFM sensor 24, the crankshaft sensor 36 and the camshaft sensors 46 and 48. At the output end, the control apparatus 50 is connected to the following: the injector 18, the throttle flap 22, the ignition system 32 and the actuators 42 and 44 of the camshafts 38 and 40, respectively.

Figure 2:
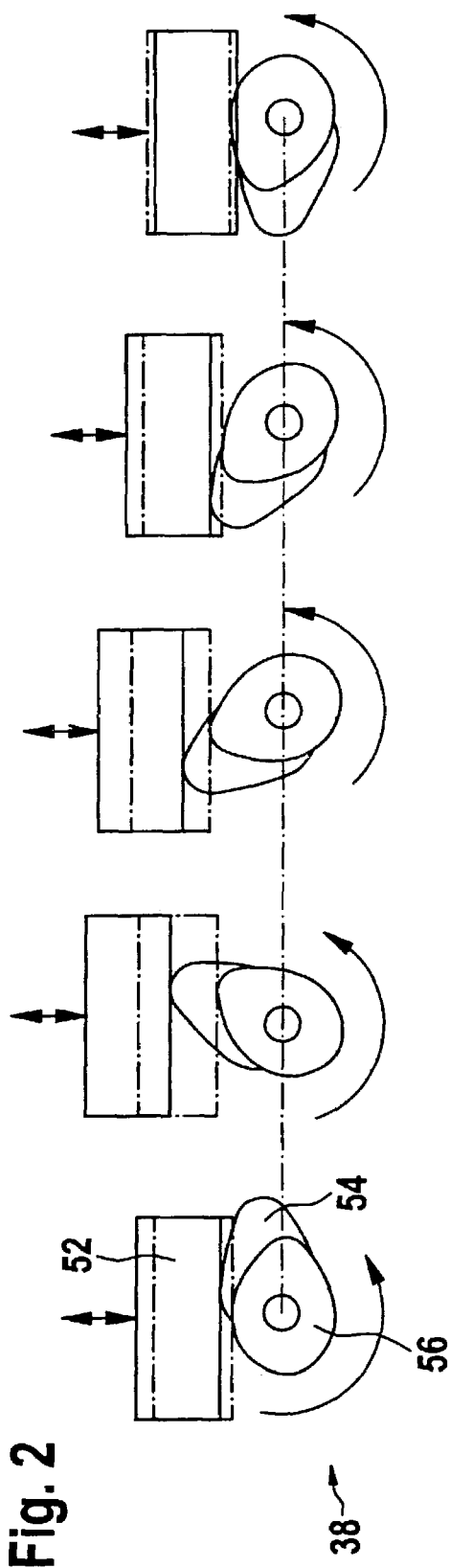
FIG. 2 is a schematic showing a sequence of views of two cams of a cam pair of the camshaft of FIG. 1 at different angular positions of the camshaft and the position of a stem of the inlet valve of FIG. 1.

In FIG. 2, the inlet camshaft 38 of FIG. 1 and the tappet 52 of the inlet valve 14 are shown. The tappet 52 of the inlet valve is not shown in FIG. 1. FIG. 2 includes five individual illustrations of the inlet camshaft 38 at different angular positions. For the sake of simplicity, only one of the five views is provided with corresponding reference numerals.

From FIG. 2, it can be seen that the inlet camshaft 38 is equipped with two cams 54 and 56, which are arranged in a pair, per inlet valve 14. A shift of the inlet camshaft 38 in its longitudinal direction is effected by one of the actuators 42. Because of this displacement, either the cam 54 or the cam 56 operates on the tappet 52. The stroke curve of the cam 54 is identified in FIG. 3 by H1 and the stroke curve of the cam 56 is identified by H2. The position of the tappet 52 is effected by the cam 54 and is shown by a solid line in FIG. 2. That position which is effected by the cam 56 is shown in phantom outline.

Figure 3:
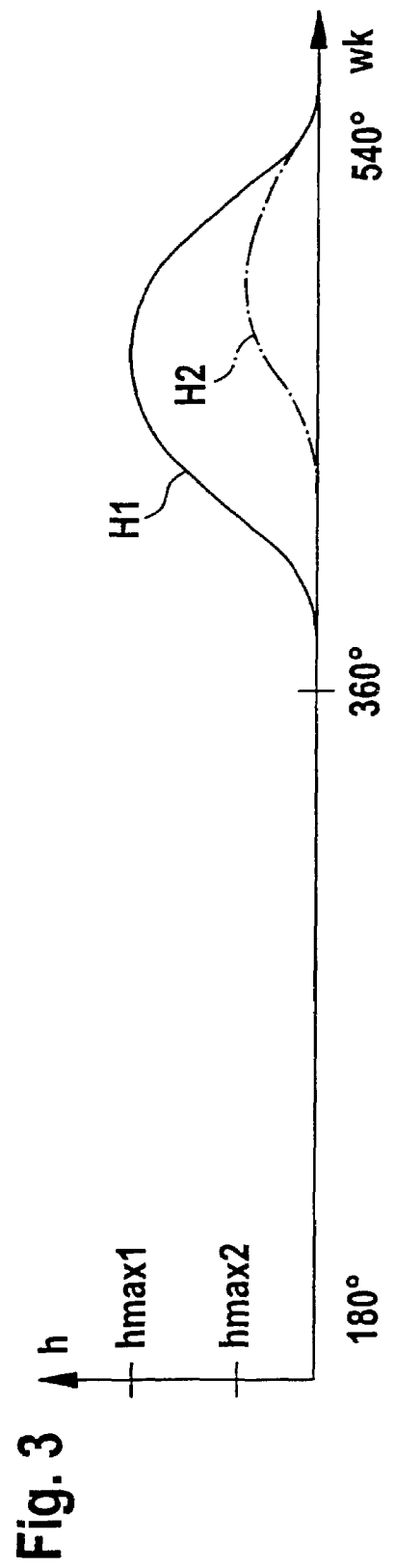
FIG. 3 is a plot of the stroke curves of the inlet valve of FIG. 1 effected by the two cams shown in FIG. 2.

From FIG. 3, it can be seen that the maximum stroke hmax1 of the tappet 52, which is effected by the cam 54, is approximately twice as long as the maximum stroke hmax2 which is effected by the cam 56. When the tappet 52 is struck by the cam 56, the inlet valve 14 opens later than in the case in which the tappet 52 is struck by the cam 54. Finally, FIG. 3 shows that the closing angle of the inlet valve 14 is always the same for the stroke curves H1 and H2. The above is based on the following consideration.

Variable valve control times afford the advantage that the requirements for low exhaust gas emission and low consumption can be better satisfied in all rpm ranges than with non-variable valve controls. A simple possibility to change the control times of the inlet valve 14 comprises that the tappet 52 is either actuated by the cam 54 or by the cam 56 and, in this way, the different stroke curves H1 and H2, respectively, of FIG. 3 can be realized. However, attention must be given to the situation that, when switching over from one stroke curve to the other, the torque does not change suddenly because of the switchover.

It was recognized that, at low rpms, the air charge, which reaches the combustion chamber 12, is approximately the same also for different stroke curves when the closing time point of the valve stroke curves is the same. The air charge, which is present in the combustion chamber 12, is, however, a significant parameter for the torque which is generated by the engine 10. Accordingly, when the closing time point of the inlet valve 14 is approximately the same for both valve stroke curves H1 and H2 as is the case for the two stroke curves H1 and H2 of FIG. 3, it can be assumed that, at least at low rpms, no sudden change of the torque, which is generated by the engine 10, occurs when switching over from one valve stroke curve to the other.

A simultaneous closing point of the inlet valve 14 can be realized in that the two cams 54 and 56 are so configured and rigidly arranged with respect to each other that the corresponding valve stroke curves H1 and H2 always lead to a same closure angle of the inlet valve 14 which is independent of the selected stroke curves H1 or H2. Even a slightly later closure of the inlet valve 14 can have an advantageous effect when using the stroke curve H2 (lesser maximum stroke) relative to the use of the stroke curve H1. In this way, the charge loss is compensated which is present because of the lesser stroke at a specific rpm.

The simultaneousness of the closure angles of the inlet valve 14 for the two valve stroke curves H1 and H2 for the embodiments shown in FIGS. 2 and 3 has, however, a disadvantage in specific cases as can be seen from FIG. 4. In specific cases, it is advantageous to not only vary the control times of the inlet valve 14 in that there is a switching from one valve stroke curve to the other; instead, the phase position of the valve stroke curve is changed with respect to the crankshaft angle. This phase shift can take place technically simple in a continuous manner (that is, without intermediate steps) by a rotation of the inlet camshaft 38 compared to the crankshaft 34. Such a rotation leads therefore to a phase shift of the camshaft 38 relative to the crankshaft 34.

In order to be able to utilize the full fuel savings and emission optimized potential of a variable valve control, the time point of the opening of the inlet valve 14 should be as close as possible in the region of top dead center of the piston (that is, approximately at 360° crankshaft angle wk) when the valve stroke curve H2 having the smaller maximum stroke is used. In order to achieve this, the phase position of the inlet camshaft 38 is shifted to "early". In this connection, reference can be made to FIG. 4 wherein the valve stroke curves having a later phase position are shown with solid lines (H1) and dash-dot lines (H2); the valve stroke curves H1 and H2 with early phase position are shown with a broken line and a valve stroke curve of outlet valve 26 is shown with a double line.

However, basically, the case must always be considered that, because of a fault in the control apparatus 50, an erroneous switchover from the small valve stroke curve H2 with small maximum stroke can occur to the valve stroke curve H1 having the large maximum stroke. The early phase position of the valve stroke curve H2 is shown by a broken line in FIG. 4 and for this early phase position and for simultaneous closure angles of both valve stroke curves H1 and H2, a collision of the inlet valve 14 with the piston could occur for an erroneous switchover of this kind (the stroke curve of the piston is identified by reference numeral 62 in FIG. 4).

In order to avoid such a collision of the valve element of the inlet valve 14 with the piston of the combustion chamber 12 when there is an erroneous switchover from one stroke curve to another, it is more advantageous when the two stroke curves H1 and H2 have the phase position to each other shown in FIG. 5. This relative phase position of the valve stroke curves H1 and H2 is so selected that the stroke curve H2 with a small maximum stroke lies approximately centrally to the stroke curve H1 having a large maximum stroke.

Even with an early absolute phase position of the stroke curve H2 having a small maximum stroke (this corresponds to an opening angle in the region of top dead center of the piston), this would not lead to a collision of the valve element of the inlet valve 14 with the piston of the engine 10 (curve 62 in FIG. 5) when an erroneous switchover occurs from the stroke curve H2 having small maximum stroke to the stroke curve H1 having large maximum stroke.

However, the closure angle of the stroke curve H2 having a short maximum stroke differs from the closing angle of the stroke curve H1 having the long maximum stroke. For this reason, another way must be found in order to ensure that no unwanted change of the torque of the engine 10 occurs when there is a switchover from one stroke curve to the other. For the above, reference is made in the following to FIGS. 6 and 7.

Figure 6:
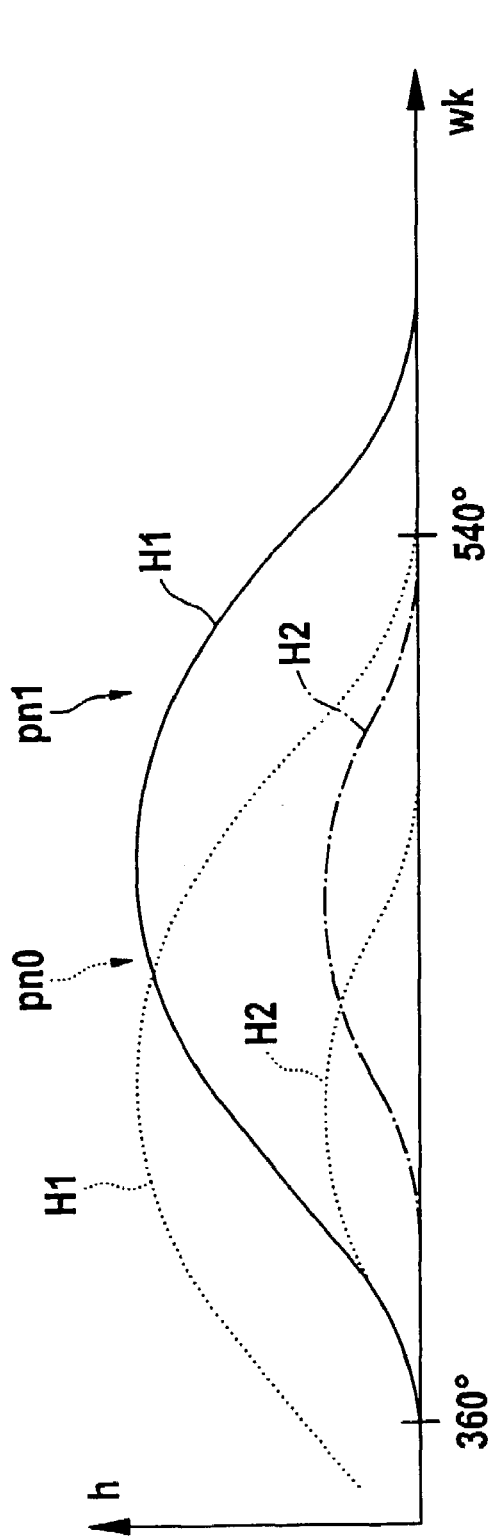
FIG. 6 is an expanded view of segments of the curves shown in FIG. 5.

In FIG. 6, the angular range between 360° and 540° of the crankshaft angle wk of FIG. 5 is shown enlarged. Valve stroke curves H1 and H2 are shown with dots at a phase angle of the inlet camshaft 38 which corresponds to a value pn0. This concerns a phase angle of the inlet camshaft 38 which corresponds to a clear shift of the inlet camshaft 38 to "early".

Figure 7:
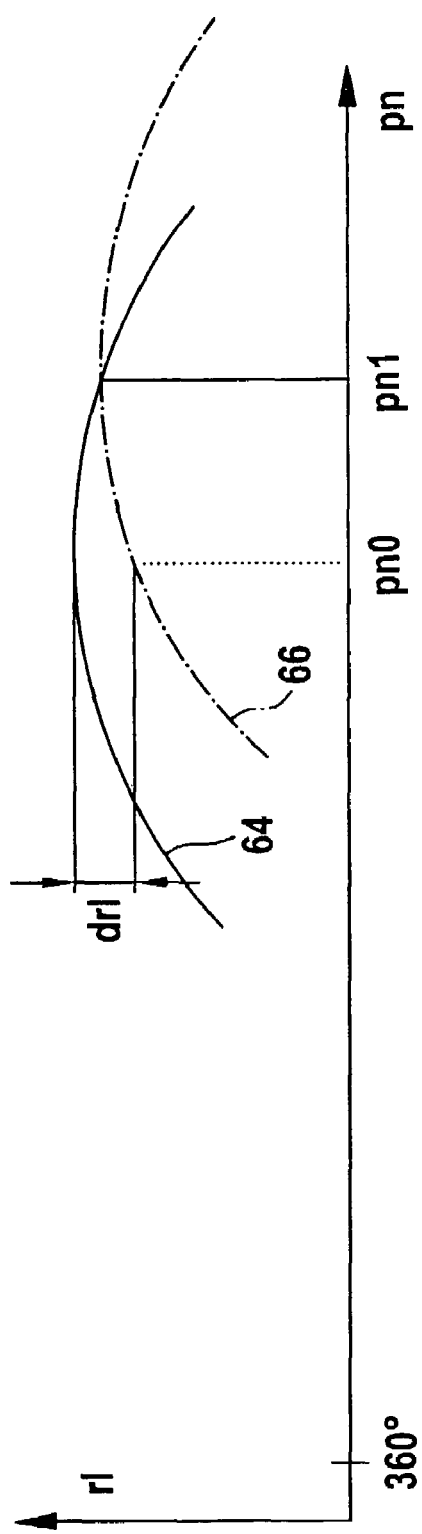
FIG. 7 is a diagram wherein an air charge is shown for different phase positions of the camshaft with this air charge being effected by the valve stroke curves of FIG. 6; and, FIG. 8 is a flowchart showing an embodiment of a method of the invention for switching over from one cam to the other of a camshaft.

In FIG. 7, the air charge rl of the combustion chamber 12 is shown which is achieved for the different stroke curves H1 and H2 at different phase angles of the inlet camshaft 38. Each air charge curve, which is achieved with the stroke curve H1, is identified in FIG. 7 by reference numeral 64 and is a solid line. That air charge curve which is achieved with the stroke curve H2 (short maximum stroke) is identified by reference numeral 66 in FIG. 7 and is a dot-dash line.

It can be seen that for an absolute phase position pn0 of the inlet camshaft 38, the air charge in combustion chamber 12, which is achieved with the stroke curve H1 (long maximum stroke), is clearly greater than the air charge which is achieved at the same phase position pn0 with the stroke curve H2 (short maximum stroke). The difference of this air charge rl is identified in FIG. 7 as drl. Such a difference drl in the air charge rl would, however, lead to an unwanted torque jump of the engine 10.

In FIG. 7, however, it can be seen that with a shift of the phase position pn of the inlet camshaft 38 toward "late", the air charge, which is obtainable with the curve H2 (short maximum stroke) in the combustion chamber 12, increases; in contrast, that air charge decreases which can be introduced into the combustion chamber 12 with the stroke curve H1 (long maximum stroke). The air charge curve 64 intersects the air charge curve 66 at a phase position of the inlet camshaft 38 which has the value pn1. This means that an unwanted torque jump of the engine 10 does not occur when there is a switchover from one stroke curve to another, if, before a switchover from one stroke curve to the other, the phase position pn of the inlet camshaft 38 is adjusted to the value pn1 notwithstanding unequal closure angles of the two stroke curves H1 and H2.

Figure 8:
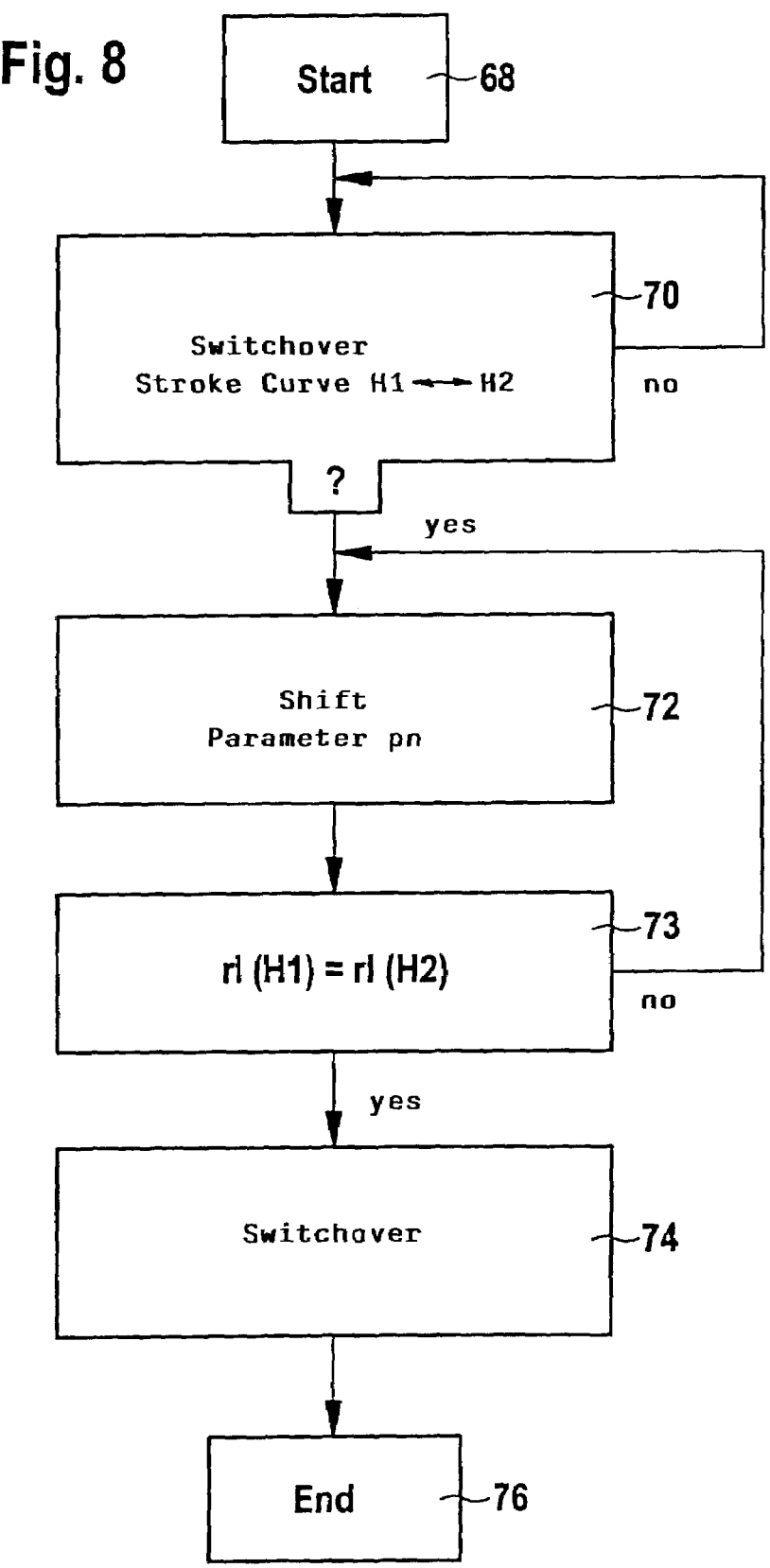

A corresponding method is shown in FIG. 8 as a flowchart. After a start block 68, a check is made in block 70 as to whether there should be a switchover from one curve H1 to another stroke curve H2. If this is the case, the phase position pn of the inlet camshaft 38 is shifted in block 72. During the shift in block 72, a check is made in block 73 as to whether, for the instantaneous operating point of the engine 10 at the adjusted phase position pn, the air charge rl of the stroke curve H1 is equal to the air charge rl of the stroke curve H2. If this is so, then in block 74, there is a switchover from one stroke curve to the other stroke curve. This method ends in block 76.

It is understood that the phase position of the inlet camshaft 38 at which, for the instantaneous operating point of the engine 10, the air charges rl of the two stroke curves H1 and H2 are equal, can be determined directly from one or several characteristic fields and so the corresponding phase position could be immediately approached.

It is understood that the foregoing description is that of the preferred embodiments of the invention and that various changes and modifications may be made thereto without departing from the spirit and scope of the invention as defined in the appended claims.

What is claimed is:

1. A method of operating an internal combustion engine having at least one inlet valve, said engine having an operation defined at least by the following parameters: opening angle, closing angle, valve stroke curves (H1, H2) and phase position (pn) of the valve stroke curves (H1, H2), and wherein a first one of said parameters is continuously shiftable and a second one of said parameters can be switched in steps, the method comprising the steps of:
   adjusting said first parameter so that at least one condition variable of the combustion of a combustion chamber assigned to said inlet valve does not change when later switching over said second parameter; and,
   then, switching over said second parameter.

2. The method of claim 1, wherein said condition variable of said combustion includes at least one of a fresh air charge (rl) and a combustion centroid.

3. The method of claim 2, wherein said second parameter corresponds to said valve stroke curves (H1, H2) in such a manner that said valve stroke curves (H1, H2) differ from each other by at least the respective maximum strokes; and, said first parameter is the phase position (pn) of said valve stroke curves (H1, H2).

4. A method of operating an internal combustion engine having at least one inlet valve, said engine having an operation defined at least by the following parameters: opening angle, closing angle, valve stroke curves (H1, H2) and phase position (pn) of the valve stroke curves (H1, H2), and wherein a first one of said parameters is continuously shiftable and a second one of said parameters can be switched in steps, the method comprising the steps of:
   adjusting said first parameter so that at least one condition variable of the combustion of a combustion chamber assigned to said inlet valve does not change when later switching over said second parameter; and,
   then, switching over said second parameter;
   said condition variable of said combustion includes at least one of a fresh air charge (rl) and a combustion centroid;
   said second parameter corresponds to said valve stroke curves (H1, H2) in such a manner that said valve stroke curves (H1, H2) differ from each other by at least the respective maximum strokes; and, said first parameter is the phase position (pn) of said valve stroke curves (H1, H2);
   said closing angle being approximately the same for the same phase position (pn) for all of said valve stroke curves (H1, H2); and,
   said switchover of said valve stroke curves (H1, H2) taking place only at low and/or mid rpms.

5. The method of claim 4, wherein said internal combustion engine has an outlet valve; and, no or no significant valve overlapping is present between said inlet valve and said outlet valve at the time point of switchover.

6. The method of claim 3, wherein one of said valve stroke curves (H2) has a shorter maximum stroke and is arranged approximately at center within the other one of said valve stroke curves (H1) having a longer maximum stroke; and, said switchover from one of said curves (H1, H2) to the other one of said curves (H2, H1) takes place at a late phase position (pn1) of said valve stroke curves (H1, H2) for which approximately the same fresh air charge (rl) is obtained in said combustion chamber.

7. The method of claim 1, wherein a plurality of said inlet valves are provided for each of the combustion chambers; and, one of said valve stroke curves of at least one of said inlet valves has the maximum stroke zero.

8. A method for operating an internal combustion engine having at least one inlet valve, said engine having an operation defined by at least the parameters: opening angle, closing angle and valve stroke curves (H1, H2) and wherein there can be stepwise switching from one of said valve stroke curves (H1, H2) to the other one of said valve stroke curves (H2, H1), the method comprising the steps of:

causing the closing angle of the inlet valve to be approximately equal for all of said valve stroke curves (H1, H2); and, switching over from one of said valve stroke curves (H1, H2) to the other one of said valve stroke curves (H2, H1) only at low and/or mid rpms.

9. A computer program recorded on a computer-readable media and suitable for carrying out a method of operating an internal combustion engine when said program is executed on a computer, the engine having at least one inlet valve and an operation defined by at least the following parameters: opening angle, closing angle, valve stroke curves (H1, H2) and phase position (pn) of said valve stroke curves (H1, H2), and wherein a first one of said parameters is continuously shiftable and a second one of said parameters can be switched in steps, the method comprising the steps of:

adjusting said first parameter so that at least one condition variable of the combustion of a combustion chamber assigned to said inlet valve does not change when later switching over said second parameter; and, then, switching over said second parameter.

10. The computer program of claim 9, wherein said program is stored in a memory including a flash memory.

11. A control apparatus for operating an internal combustion engine, the control apparatus comprising:

a memory on which a computer program is stored, said computer program being suitable for carrying out a method for operating said internal combustion engine, the engine having at least one inlet valve and an operation defined by at least the following parameters: opening angle, closing angle, valve stroke curves (H1, H2) and phase position (pn) of said valve stroke curves (H1, H2), and wherein a first one of said parameters is continuously shiftable and a second one of said parameters can be switched in steps, the method including the steps of:

adjusting said first parameter so that at least one condition variable of the combustion of a combustion chamber assigned to said inlet valve does not change when later switching over said second parameter; and, then, switching over said second parameter.

12. An internal combustion engine comprising a control apparatus for operating the internal combustion engine, the control apparatus including a memory on which a computer program is stored, said computer program being suitable for carrying out a method for operating said internal combustion engine, the engine having at least one inlet valve and an operation defined by at least the following parameters: opening angle, closing angle, valve stroke curves (H1, H2) and phase position (pn) of said valve stroke curves (H1, H2), and wherein a first one of said parameters is continuously shiftable and a second one of said parameters can be switched in steps, the method including the steps of:

adjusting said first parameter so that at least one condition variable of the combustion of a combustion chamber assigned to said inlet valve does not change when later switching over said second parameter; and, then, switching over said second parameter.

\* \* \* \* \*